Dec. 21, 1965    D. W. BEECHER    3,224,557
ARTICLE SPACING SYSTEM FOR CONVEYORS
Filed June 19, 1963    5 Sheets-Sheet 1
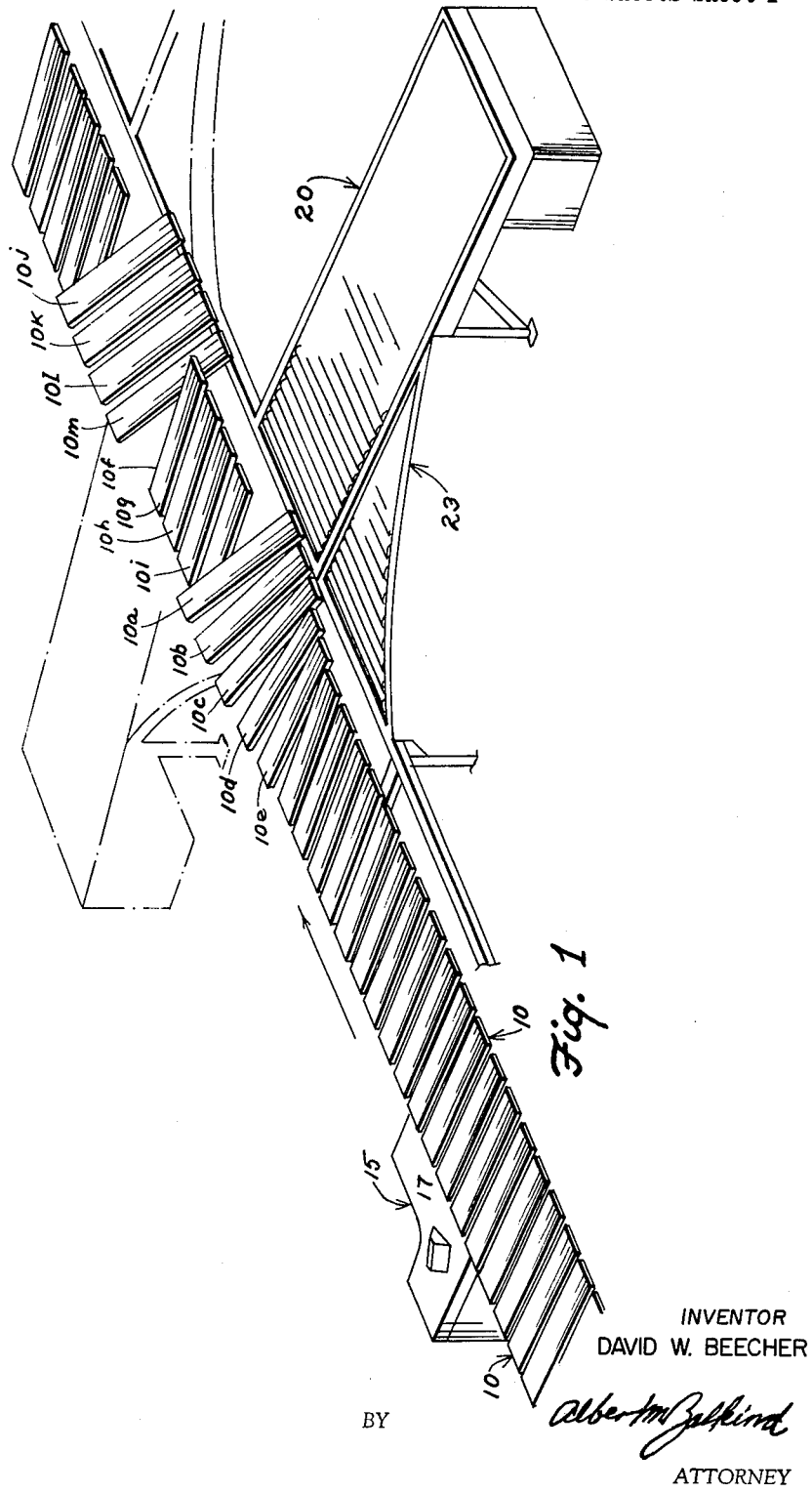
INVENTOR
DAVID W. BEECHER
BY
ATTORNEY

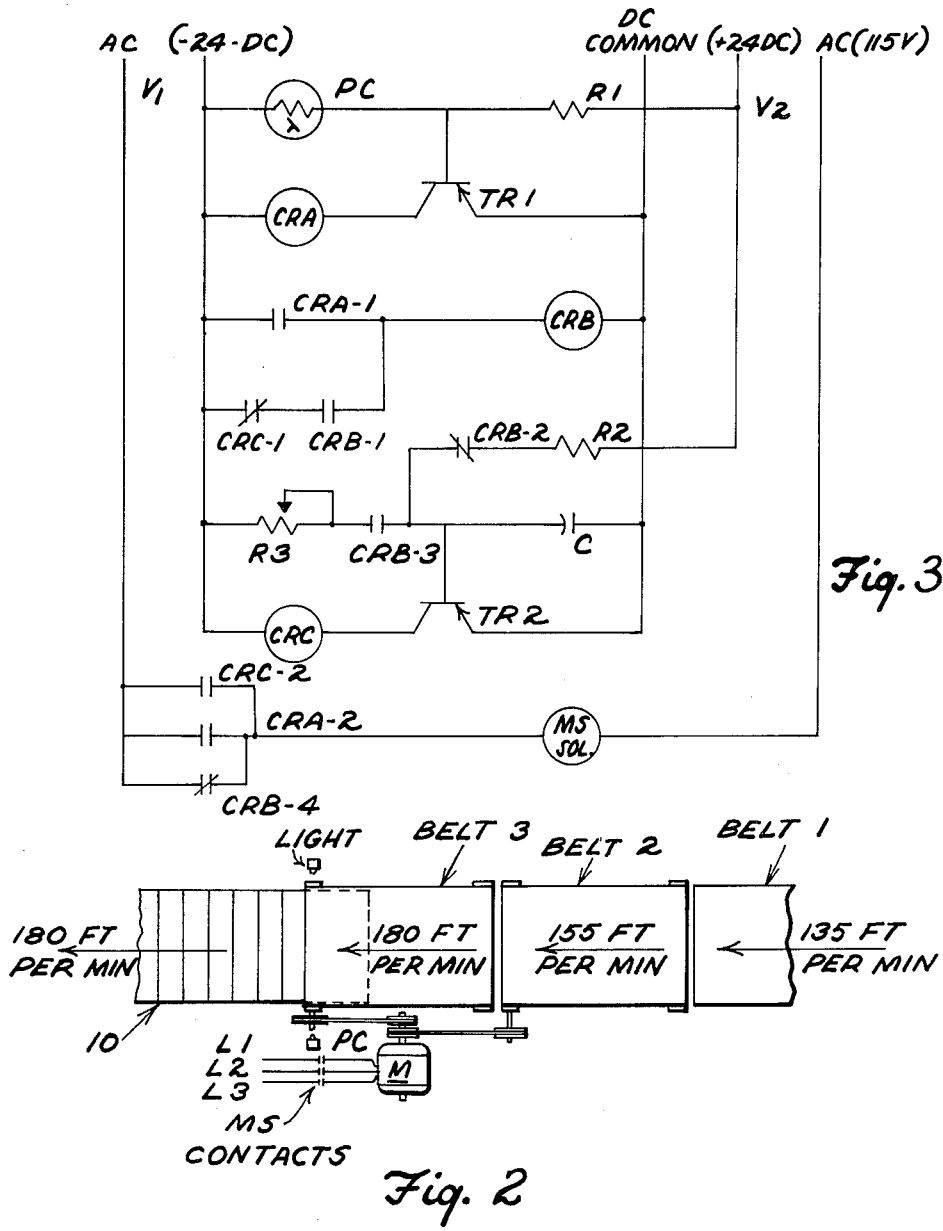

Dec. 21, 1965   D. W. BEECHER   3,224,557
ARTICLE SPACING SYSTEM FOR CONVEYORS
Filed June 19, 1963   5 Sheets-Sheet 4

BY

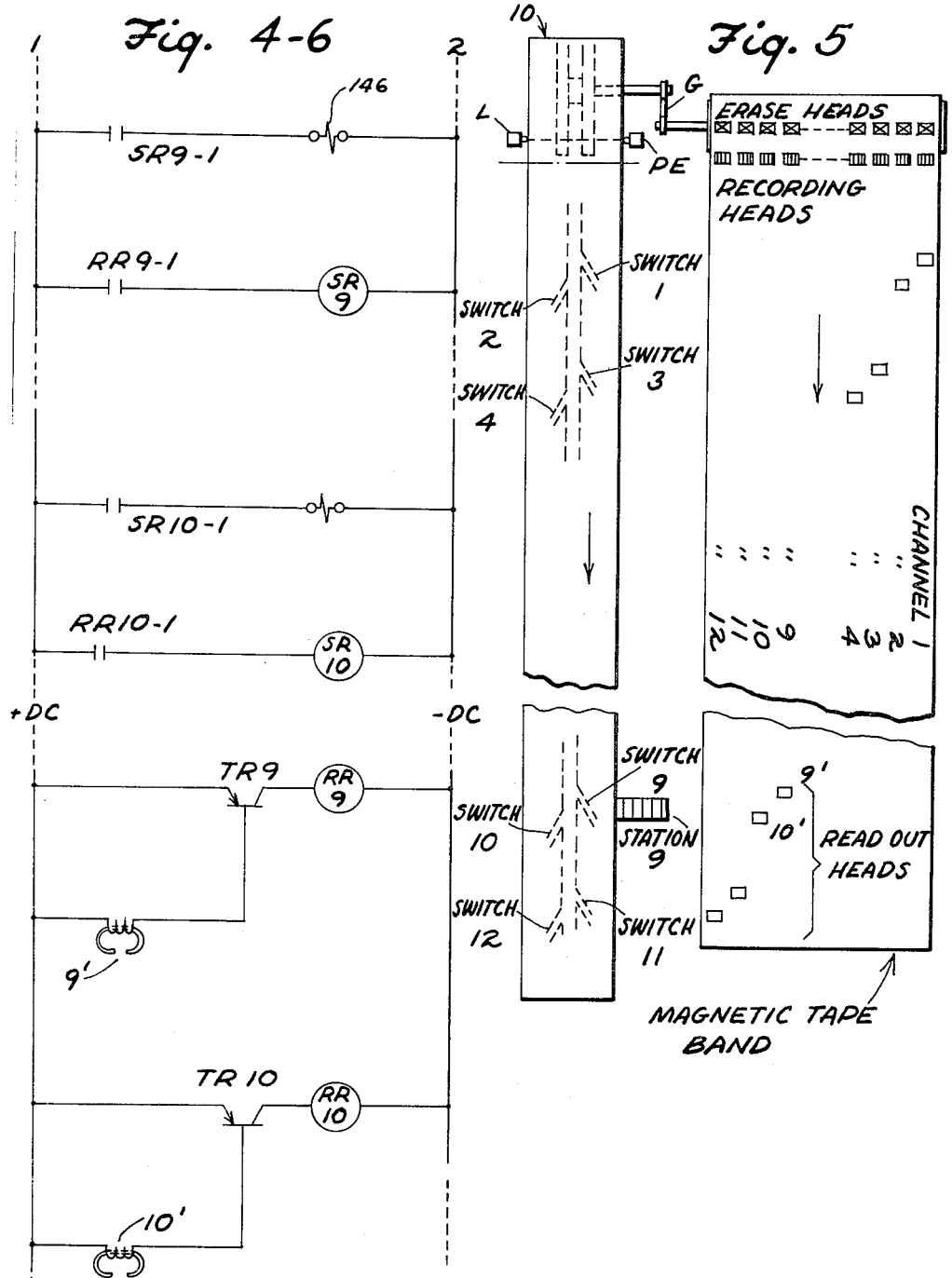

3,224,557
ARTICLE SPACING SYSTEM FOR CONVEYORS
David W. Beecher, Rockville, Md., assignor to Aerojet-General Corporation, El Monte, Calif.
Filed June 19, 1963, Ser. No. 289,465
11 Claims. (Cl. 198—34)

This invention relates to belts placed upstream of conveyor belts for the purpose of providing predetermined spacing to packages or articles to be carried on such conveyor belts. The invention is intended to be used in conjunction with a sorting conveyor system disclosed in a copending application, S.N. 288,928, entitled Improvements in Sorting Conveyors, Especially for Postal Systems, filed contemporaneously herewith, June 19, 1963, and assigned to the same assignee, the inventors therein being: Theodore B. Atanasoff, Stanley W. Kerkering, and Gordon L. Morgret. Reference is made to the copending application for a complete understanding of the present case.

The invention in the aforementioned application relates to sorting conveyors of the type whereon bulk mail postal sacks, or parcel post packages, parcels, etc., are placed and discharged along the length of the conveyor in accordance with particular destinations; for example, states, cities, etc., to which such items are to be forwarded. The discharge at various stations along the length of the conveyor is under control of a programming system wherein one or more operators press the keys of respective keyboards in accordance with a certain destination code for each of the items thus placed on the conveyor. The conveyor may consist of a continuously moving belt or other type of conveyance, and the instrumentalities for removing items at predetermined points along the length of such belt have heretofore consisted of swinging paddles or other mechanisms which became operative at respective stations, depending on whether or not an item is to be removed, that is, diverted at such stations.

In general, many systems have been devised, particularly for use in large post offices, for automatic sorting of bulk mail or parcels in the manner generally described above.

The present invention constitutes an improvement, specifically, in prior art systems which have heretofore been limited to the handling of fairly regularly shaped objects, and objects of no greater than a particular size. Further, such prior art systems have, in operation, afforded damaging shock or impact to packages being diverted and were, therefore, inappropriate for fragile parcels. A further drawback of prior art systems is the waste in time occasioned by the fact that parcels were allocated the same amount of linear space on the conveying instrumentality, for example a belt, regardless of the actual length of such parcels. Thus, in a system of the conventional prior art, all parcels may be required to be placed on five-foot centers on the belt, even though the parcels be anywhere from six inches to five feet long. Obviously, where packages approached in length the distance between placement centers on the belt, great care was required in centering the package lengthwise with respect to the placement point, otherwise, it would not be properly diverted. In any event, it will be apparent that the length of package, that such a system could handle, was limited and that small packages wasted carrying space and thus, of course, also wasted running time.

The primary objects of the present invention are to overcome the drawbacks generally described above and a further object is to provide a conveyor mechanism having simple and rugged parts capable of standing up under prolonged and heavy wear and wherein worn out parts may be easily replaced without the need for complete removal or disassembly of the conveyor. Other objects and features of the invention will be apparent from the description to follow.

Briefly, the invention comprises a conveyor mechanism in the form of a belt which moves continuously from one or more operator stations to a number of selective diverting stations in combination with feed belts, which acting prior to the main belt, provide for a certain minimum spacing between parcels thereon. The main belt does not have any diverting elements, such as paddles, pushers or the like, but of itself effects a diverting or article removal function. Thus, the main belt is comprised of a plurality of tiltable members, such as slats which are pivotally joined by means of link elements in such a manner that any slat can tilt or rock on an axis which is in the median plane of the belt and normal thereto. The slats are of such dimension in the direction of belt movement as to be less than the expected corresponding dimension of articles carried on such belt. For example, a mail sack or package may take up the width of several such slats, the width of such slats being understood as the narrow dimension parallel to the tilting axis and in the direction of movement of the belt. The length of the slats is correspondingly understood to be the actual transverse width of the belt. Each of the slats carries an element which rides in a track centrally disposed with respect to the slat and in the median plane thereof and such track is provided with mechanically operable switches, actuated by solenoids, whereby any element or series of elements connected to respective slats can be rocked by switching such elements from a track in the median plane to either of the two tracks parallel to the median track, but displaced transversely and at a higher level. Accordingly, as each such actuating element is switched in either direction to an off-center track, it causes tilting or slanting of the respective slat and a series of such slats arriving at an actuated switch would each in turn be individually and gradually tilted from its initial horizontal position to a position of some 30 degrees of slant, or sufficient to cause transverse sliding of a carried package. Thus, assuming a package rests on four slats, to be discharged onto a secondary chute or conveyor, a solenoid actuated track switch would be disposed with reference to such secondary conveyor as to effect tilting of each slat individually, beginning at the time that the first slat on which the package rested arrived at the upstream side of such secondary conveyor, which latter conveyor will be understood to be generally transversely disposed of the main conveyor. By the time such first slat had reached approximately half way of the width of such secondary conveyor, it would be fully tilted to the extent provided by the off-center tracks and the slats trailing such slat would be experiencing gradual tilt up to the point of full tilt, precisely as was experienced by the first slat. Accordingly, the package supported on the four slats would experience a gradual increasing gravitation force thereon beginning at its front or downstream end and commences to slide onto the secondary conveyor. As the fourth slat reaches its full tilt in passing the secondary conveyor station, the package becomes fully discharged onto the secondary conveyor. By effecting such a gradual application of gravitational force, the package is very gently handled in being thus diverted. Note that no thrust or push member has been applied to the package whatsoever and its length is theoretically unlimited, since it may rest on any number of slats along the length of the main conveyor. It is, of course, understood that package length is limited by transverse width of secondary conveyors where secondary conveyors are used. However, such limitation is eliminated where packages are allowed to merely slide from the slats onto a large platform. It should further be noted that the track switch remains in slat tilting condition so that all slats which follow the package carrying slats are likewise tilted; however, the control system enables the track switch to resume central position so that slats following any particular package supporting slats will remain horizontal where they in turn support a package to be diverted at some other point downstream of the diverting station described above.

From the above description, it will be apparent that the conveyor of the invention can handle packages and parcels of irregular size, of extreme length, and in a reasonably gentle manner, and that packages may be loaded onto the belt one after the other, there being as a practical matter one slat left between each group of package supporting slats so as to avoid any possible interference between packages. Assurance of such single slat spacing between packages is brought about by a series of spacing belts or conveyors on which the parcels are initially loaded and which are provided with progressively varying speeds under automatic control to ensure a spacing between the rear of one package and the front of another, of at least the width of one slat.

The control system is relatively simple in nature considering the versatility of the apparatus. Thus, programming may be effected by operators standing at conventional and commercially obtainable keyboards and there is no problem of package placement at spaced distances, nor any need to record package length. By the arrangement wherein all slats following the initial load bearing slat are tilted provided they carry no load, the need for recording package length, predetermining the number of slats that will tilt, is eliminated.

The belt, as mentioned above, is fully articulated by means of link elements pivoted to each other and each such link element carries a pivotally mounted slat, such pivotal mounting being effected by a pin passing through the slat support element which is normally maintained in the vertical plane, except when tilting the slat to one side or the other. The entire belt is carried between a pair of sprockets, one of which is powered to effect drive and the other being an idler, such sprockets being at the belt ends. The individual links are provided with rollers supported in tracks or channels carried on the frame of the conveyor, which may be comprised of angle iron. Thus, a conveyor comprised of a very large number of slats may be constructed in a relatively simple and economic manner.

A detailed description of the invention now follows, in conjunction with the appended drawing, in which:

FIG. 1 is a perspective showing a fragment of a slat conveyor belt for purposes of illustrating the tilting of the slats in conjunction with a diverting station;

FIG. 2 is a fragmentary plan layout showing the arrangement of spacer belts in tandem with the sorting conveyor belt;

FIG. 3 is an electrical schematic diagram for control of the spacer belts;

FIG. 4–1 through 4–6 are electrical schematic diagrams for control of the slats of the conveyor, in order to effect diverting of packages at various stations, in accordance with a program on magnetic tape;

FIG. 5 is a diagram plan layout showing the relationship between the magnetic tape on which diverting signals are impressed, in conjunction with the sorting conveyor and diverter stations.

Figures 1, 4:
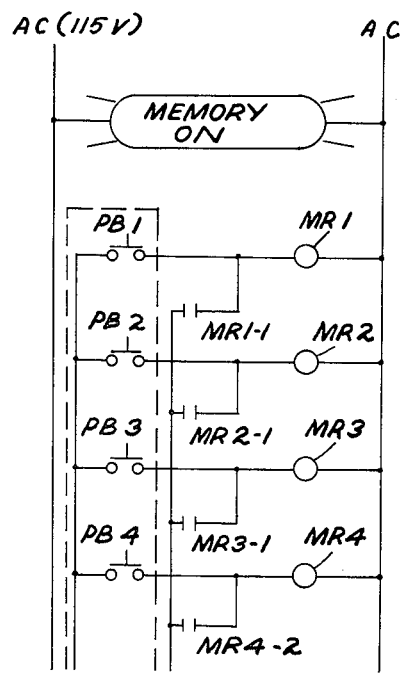

Referring now to FIG. 1, a fragmentary section of a slat conveyor of the type hereinbefore described is disclosed as a series of slats which will be understood to form a continuous belt (see FIGS. 2 and 3) and which are moving in the direction of the arrow. Such slats are all identical, and are identified with the general reference numeral 10. An operator stands at an operator station 15 at one side of the conveyor and it will be understood that he programs packages in accordance with destination with a keyboard 17. More specifically, the control system merely effects movement of a solenoid operated mechanical track switch (to be described) at each diverter station, such as diverter station 20 as indicated by the roller type secondary conveyor shown thereat. Accordingly, all slats passing such conveyor will commence to tilt upon reaching the secondary conveyor, and each slat in turn will tile progressively until it reaches full tilt position. Considering the slats designated as 10a–10e, it will be noted that the slat 10e is beginning to tilt and that the slats downstream thereof are in conditions of progressively greater tilt. Thus, it will be appreciated that initially 10a experienced the slight degree of tilt shown by the slat 10e when it was in the position shown for 10e and then experienced gradually greater tilt up to the maximum slant depicted.

The side extension 23 of the secondary conveyor provides a safeguard for exceedingly long packages. Accordingly, any package placed on the group of slats 10a–10e will thus be gradually slid off onto the secondary conveyor. Such package may experience a certain amount of rotation due to the warping action of the progressively tilting slats, but this is of no consequence. Downstream of the slat group 10a–10e will be noted a horizontal group of four slats 10f–10i and this illustrates that such slats have not been tilted, either because they bore no parcel or they are bearing a parcel (not shown) to be diverted further on along the length of the belt. On the other hand, downstream of the horizontal group of four slats, 10f–10i, is another group of four slats, 10j–10m, and it will be noted that these are all fully tilted slats. This means that they must have borne a parcel which was either diverted at the station 20, or upstream of the station 20. Accordingly, the slats 10f–10i must be carrying a parcel or else they, too, would be in the fully tilted position of the slats 10j–10m since, as noted above, once any slat starts to tilt, all succeeding slats likewise tilt until a slat is reached which is the first slat of a parcel carrying group, regardless of how far down the belt, that is, upstream, such parcel may be.

Control of the conveyor is effected by a memory or programming system to enable an operator or operators to divert parcels selectively at the stations.

The electrical circuitry of the control system is effective to prevent tilting of any slats carrying a parcel where such parcel is intended to be diverted downstream of a station at which the track switch is actuated. This is brought about by de-energizaion of the latter switch solenoid responsive to sensing of entry of that parcel on the conveyor, a photoelectric cell being used as a sensing means. Full circuit explanation will hereinafter be given.

It will, of course, be appreciated that the slats could be spaced apart several inches and need not be closely adjacent each other. This would, of course, depend on the nature and size of articles to be handled. If necessary, a flexible rubber or plastic belt may be disposed encompassing all the slats so as to provide support intermediate the slats for articles placed on the conveyor. Of course, such a belt would have to be of sufficient flexibility so as to readily yield as the slats tilt. Further, as an economy measure in construction, it would be possible to have alternate slats merely carried between adjacent slats as by tension springs or chains, or by any other medium which will effect proper support and allow relative flexure.

With such an arrangement the supporting posts for alternate slats together with the roller carriages therefor could be eliminated. Thus, the roller carriages would be spaced by suitable links sufficient to provide flexibility of the articulated carriages in going around the sprocket wheels.

Various other modifications of the mechanical arrangement could be made, as will be evident to persons skilled in the art and the above discussion is merely to point out the breadth of the invention.

The spacer system

In order to effect proper operation of the slat belt sorter hereinabove described, it is essential that all slats under a particular parcel effect tilt at a designated diverting station. To achieve this, proper spacing of parcels in the direction of flow is necessary. The system hereinbelow described, prevents two parcels from resting on the same slat and in fact ensures a separation between trailing and leading ends of consecutive parcels so as to maintain a spacing of more than one slat width in the flow direction between such parcels.

Thus, in actual practice with an operating machine, a minimum spacing of 12" is desired, whereas the slat width is approximately 8" with one inch space between slats.

Figures 2, 4:
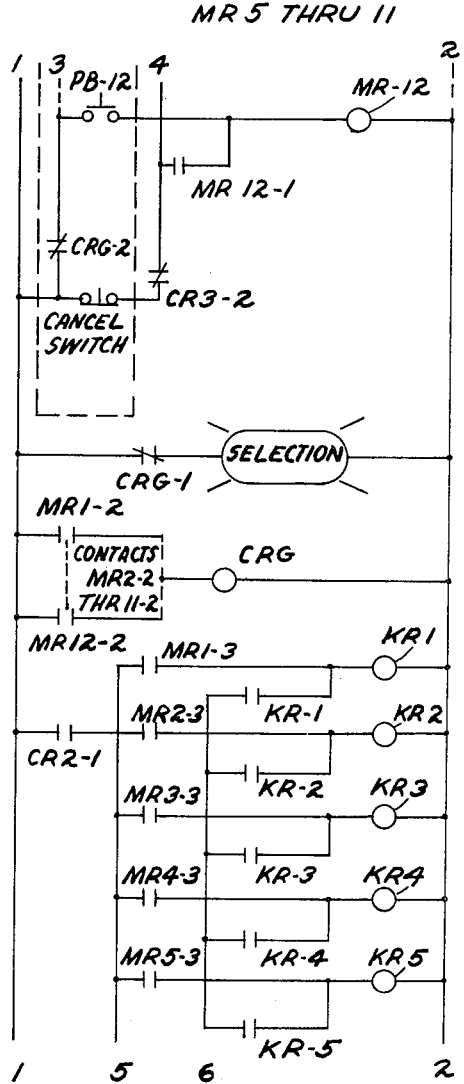
Figures 3, 4:
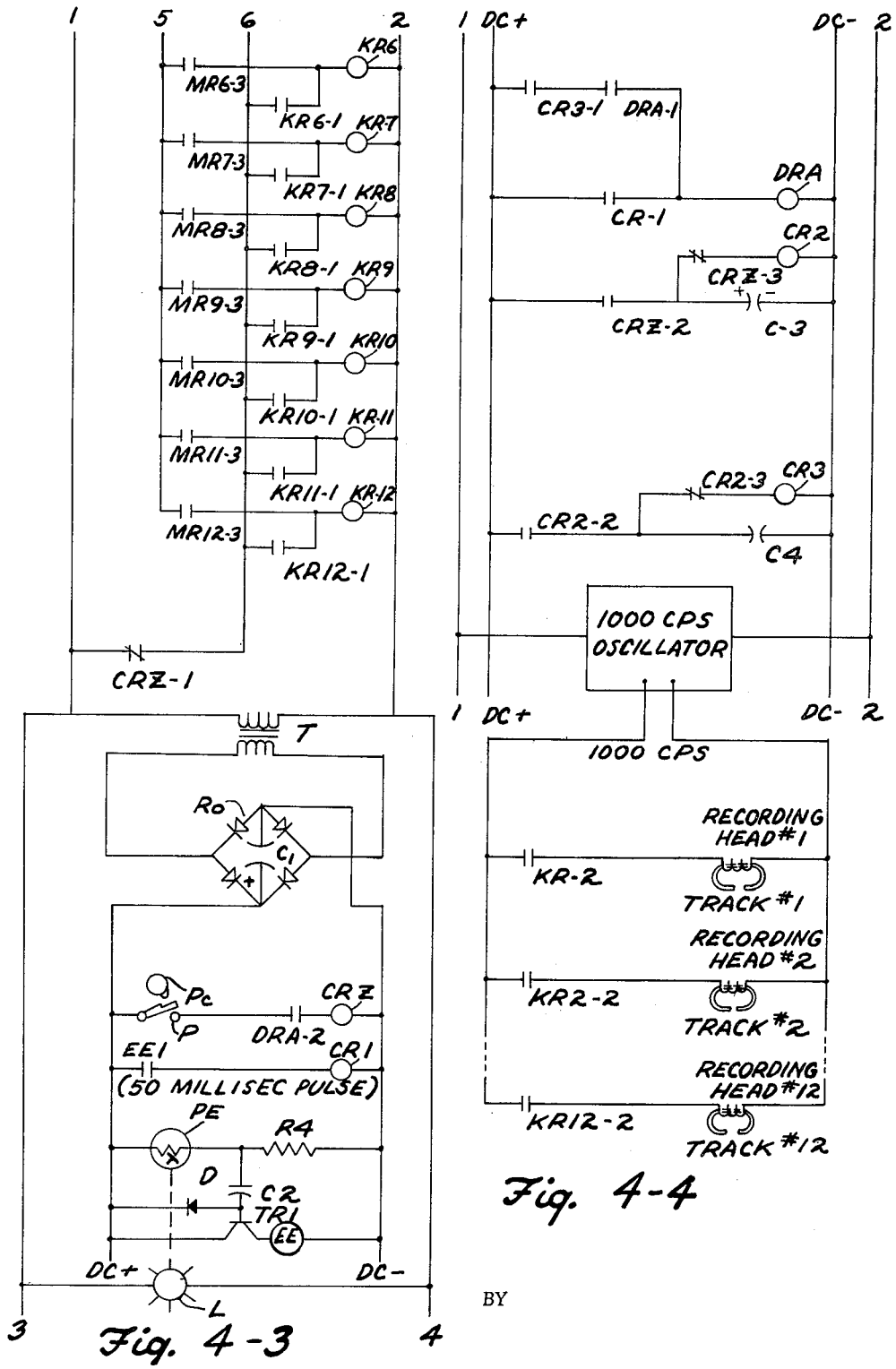

The spacing system for assuring proper separation between parcels, is shown in conjunction with FIGS. 2 and 3 wherein FIG. 2 shows the tandem disposition of the conveyor belt 10 and a series of spacer conveyor belts designated as Belt 1, Belt 2 and Belt 3.

Packages are initially loaded on Belt 1. Assuming that the desired speed of conveyor 10 is 180 feet per minute, an appropriate speed for Belt 1 could be 135 feet per minute, and this belt could be kept continuously running under usual loading conditions. The normal speed of Belt 2 would then be 155 feet per minute and that of Belt 3 would be 180 feet per minute, and these latter belts are driven by a common motor M through a pulley system as shown. The motor is of a type which can start and stop very rapidly, being equipped with suitable automatic braking for quick stop. The motor may be operated from a three-phase line through the solenoid operated motor starter, MS, having contacts in four lines $L_1, L_2, L_3$ as shown.

At the downstream end of Belt 3, there is arranged a light which sends a beam across the belt to a photo-cell PC and it will be understood that any package crossing between the light and the cell, will interrupt the beam.

Assuming that packages 3 feet long are placed on Belt 1, end to end, that is on 3 feet centers, their center to center spacing would be $$3 \text{ ft.} \times \frac{180}{135}$$

or 4 feet, in going from Belt 1 to the conveying belt. Accordingly, the space between consecutive packages would be one foot.

It can be assumed that parcels are frictionally gripped at their centers of gravity in moving to a successive belt and that such centers of gravity are at parcel centers. This would not usually be the case, but the system is operative as described regardless of random center of gravity spacing.

Where the end to end spacing is one foot there would be no need for Belts 2 and 3. However, assuming that packages are only 1½ feet long, their center to center spacing, when placed on Belt 1, would then be only 1½ feet and at the time of arrival at the sorting conveyor belt, such spacing would only be 2 feet. The spacing between packages would then be only 6" and additional spacing is required to ensure accuracy in diverting. By means of the Belts 2 and 3 which stop and start responsive to conditions of spacing, parcels are spaced further apart when sensed at less than one foot spacing.

A general description and operating of the spacing control system is as follows: Condenser C (FIG. 3) has a time rate of discharge via variable resistance R3 that corresponds to the desired spacing as a matter of travel time of articles on Belt 3. Thus, R3 is variable to predetermine such spacing, and condenser C discharges through R3 as long as the photocell is illuminated. On the other hand, C is charged while an article is passing the photo-cell, charging being accomplished quickly through resistance R2, which resistance is for preventing excess current rather than limiting the rate of charge, since it is desired to charge C as rapidly as possible but to discharge it through the time constant circuit which comprises R3–C while the cell is illuminated.

The extent of discharge of C (FIG. 3) determines whether or not Belts 2 and 3 are operative. If the parcels are too close, insufficient discharge occurs due to the cell being darkened too soon by the upstream parcel. The motor stops substantially as soon as the beam is blocked by the upstream parcel and it remains stopped long enough for the downstream parcel to be carried off on conveyor 10 so as to effect a one foot spacing before the upstream parcel is again moved.

A pair of transistors (PNP type) are provided, one of which, TR1, is responsive to the article sensing means, i.e., the photocell PC to condition certain relays for control of charge and discharge of C, and a transistor TR2 which controls the actual starting and stopping of motor M via relay means responsive to charged or discharged condition of C.

Accordingly, whether or not the motor starts or stops is a matter of the time occurring between illumination and darkening of PC which depends on the spacing between the trailing edge of a parcel and the leading edge of a successive parcel, as compared with the time constant of R3–C, which is designed so that C will discharge if the spacing is a foot or more.

The detailed description and operation of the motor control circuit of FIG. 3 now follows.

Assume no articles on the Belts 1 and 2, and the motor M is running, energized from the A.C. lines, current passing through MS via relay contacts of circuitry to be hereinafter described. The photocell PC is illuminated, the transistor TR1 being biased thereby to conduct. Photocell PC is a photo resistive type and is in series with a resistor R1 having a value about midway between the light and dark resistance of the cell. Thus, conducting bias for TR1 (base negative and emitter positive) is effected by the D.C. common line to the emitter and through photocell PC from the —24 v. line $V_1$ to the base, wherein the common line has a potential midway between —24 v. and +24 v., the total voltage being 48 v. between negative and positive lines $V_1$ and $V_2$, respectively. Condenser C, which was charged from the line $V_2$ (positive) via R2 when the system was turned on has discharged via R3–C to line $V_1$ (negative) for the reason that current through TR1 has activated a relay CRA in the collector circuit to line $V_1$. Thus, contact CRA–1 activates a relay CRB to close contact CRB–3 in series with condenser C effecting a discharge path to line $V_1$. As long as the photocell remains illuminated, the condenser C remains discharged, assuming no parcel blocks the beam, and current for MS thus passes through contact CRA–2, and also through a contact CRC–2 of a relay CRC, responsive to a conducting condition of transistor TR2, but no MS current passes through NC contact CRB–4 which is open at this time (CRB energized).

Transistor TR2 is connected across the D.C. lines $V_1$ and $V_2$ with the relay CRC in series with the transistor output. When TR2 conducts, relay CRC is energized and contact CRC–2 maintains energization of the motor starter solenoid MS to keep the motor running, even should relay CRA become deenergized whence CRA–2 would be opened.

As long as no article interrupts the beam, the above condition obtains, i.e., relays CRA, CRB, CRC are activated, transistors TR1, TR2, continuously conduct, no charging current from line $V_2$ line goes to the condenser C and the condenser is discharged.

Transistor TR2 remains conducting (base negative and emitter positive) due to the state of discharge of condenser C; the NC contact CRB–2 in series with R2 being open, no charge can go to condenser C from line $V_2$, and CRB–2 being closed current from line $V_1$ can pass to the base.

However, TR-2 becomes biased to cut off (base becomes positive) should condenser C become charged positively from line V₂ and this charge occurs very rapidly should the cell be darkened by parcel interruption of the light beam. Such interruption also causes transistor TR1 to be biased to cut-off due to the large voltage drop across the photocell when it is darkened which removes negative bias from the base and leaves a positive bias via R1.

Thus, assume the leading edge of a package cuts off light to the photocell PC. The collector current for TR1 is cut off, deactivating relay CRA to open contact CRA-1 which de-energizes relay CRB. Since CRB is still energized, current is broken through contact CRB-1 which would otherwise serve as a sealing-in contact for relay CRB if NC contact CRC-1 were closed. However, the motor starter MS is still activated via contact CRC-2, although CRA-2 is now open. Further, contact CRB-3 opens while contact CRB-2 and CRB-4 close at this time. This effects charging of the condenser to 24 v., thereby biasing transistor TR2 to cut off, which then deactivates relay CRC. This, of course, occurs very rapidly, as explained above, the resistance R2 being merely to prevent excess current flow to the condenser, which might be harmful, and does not constitute any part of a time constant circuit except to the extent of protecting the condenser. Since contacts CRC-2 and CRA-2 are now both open, maintenance of activation of the motor starter MS is effected only by way of NC contact CRB-4, closed due to present deactivation of relay CRB. Accordingly, at this time the motor starter MS remains activated and the Belts 2 and 3 continue to run as long as the parcel or article is passing the photocell.

The above sequence of events conditions the system to effect stopping of the motor should the leading edge of the next successive article be less than a foot upstream of the preceding article, while at the same time maintaining the system in condition to permit continued motor operation should the next successive article be a foot or more upstream.

This conditioning of the system permits control by the setting of the variable resistor R3 such that the discharge time of the condenser C to the point where transistor TR2 becomes conducting again, responsive to illumination of the photocell after the package passes, is set to correspond to one foot of movement of the parcels on Belt 3.

Thus, assuming the leading edge of a second package is spaced a foot or more from the trailing edge of the downstream package. When the first package passes completely, the photocell is illuminated, CRA is energized via TR1 as once more conducts. CRB is energized; contact CRB-2 opens, charging current is cut off, while CRB-3 closes to permit the condenser discharge. The condenser C has time to discharge through R3 in the time that the photocell is illuminated, the light beam passing, of course, through the foot or more spacing between the two packages.

Forward bias is thus restored to transistor TR2, effecting energization of relay CRC via collector current, and all previous conditions are thus restored wherein CRA-2 and CRC-2 are closed, while CRB-4 is open. The motor starter remains energized via CRA-2 and CRC-2.

Assume, however, that the spacing between two successive packages is less than one foot in passing the beam. Beam cut off by the leading edge of the second package renders transistor TR1 non-conductive prior to the time condenser C can discharge to the point where TR2 becomes conducting. Accordingly, relay CRC remains de-energized and relay CRA now becomes de-energized. However, relay CRB remains energized since CRB-1 seals it in in series with the normally closed contact CRC-1. Thus, contact CRB-4 is open. Since CRA-2 was opened due to cut off of transistor TR1 and CRC-2 is open due to continued cut off of transistor TR2, the opening of all such contacts cuts out the motor starter to stop the motor.

Thus, the Belts 2 and 3 cease motion and the package on Belt 3 blocks the beam at the downstream end of the belt, remaining there until condenser C fully discharges to the point where TR2 becomes again conductive. By this time the proceding package has been carried off by the conveyor 10, and thus there is at least one foot of space provided between the stationary package and the preceding package. Upon TR2 becoming once more conductive after condenser discharge, relay CRC is again activated, CRC-2 closes and the motor starter is again activated whence the belts renew their motion. At this time CRC-1 opens to deactivate CRB and thus closes the normally closed contact CRB-4. Likewise CRB-3 opens and CRB-2 closes to again charge the condenser to bias the transistor TR2 to cut off, whence relay CRC is again deactivated, conditioning the system for the next package interruption of the light beam.

In substance, therefore, the contact CRC-2 maintains the belts running as long as transistor TR2 is conductive, the contact CRA-2 maintains the belts running as long as the photocell is illuminated and the contact CRB-4 maintains the belts running so long as there is at least one foot spacing between successive packages.

In order to insure proper operation of the system the condenser can charge through the resistor R2 in approximately $\frac{1}{100}$ of the time that it can discharge through resistor R3. This permits operation of the system in response to packages as small as some two inches in length.

The memory system

Reference is made to FIGS. 4–1 through 4–6 showing the circuitry for programming the conveyor to divert parcels off the belt at selected designations, and to FIG. 5 showing the diagrammatic relationship between a magnetic tape record and the slat conveyor 10.

Referring particularly to FIG. 5, it will be noted that the magnetic tape and the slat conveyor have a common drive such as any suitable motor-driven means G, e.g., gearing or the like, powered by a motor (not shown).

The magnetic tape has extending transversely thereacross a series of erase heads upstream of respective recording heads. It will be understood that there are twelve heads of each set disposed over twelve respective recording channels on the tape and that there are twelve respective readout heads, e.g., 9'; 10'; downstream to correspond in longitudinal position to the locations of the various track switches along the conveyor.

The recording heads are disposed one slat width downstream of the photocell PE which senses parcels as they enter the conveyor upstream of the diverting stations. The track switches are generally indicated as Switch 1, Switch 2, Switch 3, Switch 4 . . . Switch 9, Switch 10, Switch 11, Switch 12, corresponding to Channel 1, etc., on the tape, as will be clearly understood from the drawing. Thus, readout head 9' over Channel 9 controls track Switch 9, and is spaced from readout head 10' which controls track Switch 10 in the same ratio as the spacing between track Switches 9 and 10.

Accordingly, as the tape and the conveyor move, the erase heads first clear the tape of previous signals whence the recording heads can record signals in their respective channels for each track switch to be operated. Thus, a signal, e.g., in Channel 10 will be picked up by readout 10' at a time that a parcel is approaching track Switch 10 and the switch will be operated by its solenoid to commence tilting the slats on which the parcel rests in a manner heretofore described.

The programming of the tape is illustrated in the present instance in a simplified system utilizing a single operator rather than several operators, but it will be understood that a multi-operator system could be used, it then being necessary, of course, to provide suitable circuitry of the kind to be described for each operator with interlinking circuitry to ensure proper sequence for programming. For example, if two or more operators wish to divert respective parcels at Switch 9, it is, of course, necessary to have delay circuit for holding the separate signals for sequential recording. Referring to FIGS. 1, 2, 4–1, 4–2, an operator would be positioned at a loading point for conveyor 10 and he has a series of push buttons PB–1 through PB–12, only the first four being illustrated in FIGS. 4–1, 4–2, since all others are a duplication of the system arrangement. Thus, as a parcel is loaded, say on Belt 1 of the scraper system (FIG. 2), the operator notes the designation insofar as it pertains to a diverter station on conveyor 10 and presses the corresponding push button to record a signal on the magnetic tape which signal at the time of readout has moved under a readout head corresponding to the selected diverter station, effecting tilting of the slats at that station, this being the time of arrival of the parcel of that station.

Referring now to FIGS. 4–1 and 4–2, each of the push buttons connects to a corresponding so called "MR" relay which is a signal storing relay, such as MR1, MR2 . . . MR12, etc., activated at the time the respective button is pushed. Such activation effects storage of the signal until subsequently acting signal recording control "KR" relays, or coding relays, such as KR1, KR2 . . . KR12, etc., corresponding to respective relays MR1, MR2, etc., have been reset to remove any previous activation which they may have had. The MR relays then transfer the respective stored signals to the corresponding KR relays, causing respective activation thereof to apply a 1000 c.p.s. signal to a respective tape channel. Such signal is placed on the tape so that it will reach the appropriate readout head just before the slat under the leading edge of the programmed parcel reaches the appropriate track switch controlled by that readout head. The KR relays are sealed in energized condition until the next parcel has been loaded on Belt 1 and is programmed. However, if no further parcel is thus programmed the track switch at that station will remain in actuated condition and, thus, tilts all slats passing the station, indefinitely. If another parcel is programmed, the KR relays are reset, such tilting effect ceasing.

The above describes the general operation of the memory system, a detailed description of which will now follow.

A light L and photocell PE (FIG. 5) are arranged adjacent the upstream end of conveyor 10 and it will be understood that the coding push buttons PB1, etc. (FIGS. 4–1, 4–2) are pressed before a parcel interrupts the beam from the light to the cell. Actuation of a push button activates the corresponding MR relay which seals in through a normally open contact, for example MR1–1, MR2–1, etc. to store the signal. The energizing current is from the A.C. lines 1 and 2 shown, the common push button line 3 being shown connected to line 1 in FIG. 4–2. Activation of any such MR relay in the manner described closes a second contact such as MR–1–2 (FIG. 4–2) which energizes relay CRG to open its normally closed contact CRG–1 extinguishing a Selection lamp which indicates that a code signal has been entered in the system. At the same time normally closed contact CRG–2 (FIG. 4–2) is opened which disconnects the push button common line 3 from A.C. line 1 so that all push buttons then become momentarily inoperative against entry of a subsequent signal.

Any MR relay thus activated remains activated until the parcel for which it has been coded breaks the photocell beam. At this time the photocell ceases to conduct.

The photocell is of a photoresistive type having relatively high conduction when illuminated. It is in series with the resistor R4 across positive and negative D.C. lines as shown (FIG. 4–3). Resistor R4 is about half the dark resistance of the cell and D.C. current is afforded thereto by the full wave rectifier R₀ powered by the transformer T connected to the A.C. lines 1 and 2. The photocell controls operation of a transistor TR1 which is nonconductive when the cell is illuminated, due to lack of emitter current since the emitter and base are substantially at the same potential by virtue of the high conductivity of the illuminated photocell, as will be understood from FIG. 4–3, wherein the diode D has no effect on bias current for the transistor, but permits discharge of a condenser C2.

Thus, when current ceases to flow through the photocell, as when a parcel is passing it, the dark resistance is high and the base of TR1 is rendered negative via resistor R4 and condenser C2 and the transistor then passes current to relay EE to energize that relay. Such energization is momentary and lasts only until the capacitor C2 is sufficiently charged so that base current ceases and the transistor again becomes non-conductive. The value of C2 is such that relay EE is energized for some 30 to 50 milliseconds. Upon restoration of the light beam, the package completely passing it, the capacitor rapidly discharges through the photocell and also through a diode D so that the circuit is prepared to repeat the momentary energization of relay EE for the next package.

When EE is energized the closure of contact EE1 energizes a relay CR1 which in turn energizes a relay DRA (FIG. 4–4) through contact CR1–1. Relay DRA seals in through its contact DRA–1 and also through normally closed contact CR3–1 of a relay CR3.

The energization of relay DRA conditions the circuit for the next closure of a cam-operated contact P which sets up a train of events that de-energizes all KR relays as explained below. Contact P closes momentarily each time the leading edge of a slat aligns transversely with the photocell and it will be understood that a suitable synchronizing drive (not shown) is present to rotate the cam PC in order to achieve the desired function.

Since DRA is energized, closure of contact P energizes relay CRZ via contact DRA–2 (FIG. 4–3) by virtue of the series connection across the D.C. lines.

Energization of relay CRZ opens the normally closed contact CRZ–1 (FIG. 4–3) and thus deenergizes all KR relays by disconnection from A.C. line 1. At the same time, contact CRZ–2 closes the CRZ–3 opens which charges the capacitor C3 (FIG. 4–4). All this occurs as switch P closes; however, as soon as P opens in the course of rotation of cam PC, CRZ is deenergized so that CRZ–2 opens and CRZ–3 closes, to permit C3 (FIG. 4–4) to discharge through the relay CR2 whence energization of that relay occurs for a short duration, 30 to 50 milliseconds as determined by the value of C3, and results in the application of power to the contacts MR1–3 through MR12–3 of the MR relays via contact CR2–1 (FIG. 4–2) from A.C. line 1. These MR contacts are connected to respective KR relays, whereby any KR relay corresponding to an MR relay energized by a selected push button, is energized.

Accordingly, the respective KR contact (FIG. 4–4) such as KR1–2, KR2–2, etc., is closed to send a 1000 c.p.s. from a conventional oscillator (FIG. 4–4) as a continuous signal to the respective tape channel recording head whence the signal is recorded in a respective channel. The length of the signal is determined by the length of time the particular KR relay is energized which in turn depends on light beam interruption by the next package.

As the tape moves, the signals are picked up by the respective readout heads (FIG. 4–5) e.g., readout heads 9' and 10', which acting through respective amplifying transistors, such as TR9, TR10, etc., energizes respective relays, RR9, RR10, etc., to close respective contacts RR9–1, RR10–1, etc., thus energizing the solenoids SR9, SR10, etc., having respective contacts SR9–1, SR10–1, etc., which cause actuation of respective track switch solenoids at the diverting stations to operate respective track switches.

Further, momentary energization of relay CR2 as described above also closes contact CR2–2 (FIG. 4–4)

which permits charge of capacitor C4 from the D.C. lines; as soon as CR2 is de-energized upon completion of discharge of C3 therethrough, normally closed contact CR2-3 closes to momentarily actuate relay CR3 by discharge of C4 therethrough. Thus, normally closed contact CR3-1 is opened (FIG. 4-4) as well as normally closed contact CR3-2 (FIG. 4-2). This deenergizes relay DRA (relay CR1 de-energized to open CR1-1 when EE is deenergized) and all MR relays, the sealing current being broken for these relays. Deenergization of the MR relays effects deenergization of relay CRG (FIG. 4-2) due to opening of contacts MR1-2 through MR1-12. Accordingly, the NC contact CRG-1 is closed to light the Selection light, indicating the system may be coded for the next parcel, since all push buttons are now again live due to closing of NC contact CRG-2 (FIG. 4-2) when CRG was de-energized.

All KR relays remain actuated due to sealing in at NC contact CRZ-1 (FIG. 4-3) and remain actuated until the entire sequence is repeated by another parcel interrupting the light beam to cut off cell PE, thus energizing CRZ to open CRZ-1.

As shown in FIG. 4-2, a "cancel switch" is provided in series with lines 1 and 4. In the event the operator miscodes a parcel, pressing of this button switch cuts the current to all MR relays via their sealing contacts thus neutralizing the previously stored signal.

Due to the continued activation of any coded KR relay until a succeeding parcel interrupts the light beam, all slats reaching the respective track switch will be tilted and remain tilted until they arrive at the drive sprocket wheel at the end of the conveyor, as explained in the co-pending application.

All recordings are erased as the tape passes under the erase heads and the tape channels are then ready for fresh programming.

In summation of the above discussion:

A parcel is programmed by an operator pressing a push button at the time the parcel is loaded onto the conveyor or onto any entrance belt, but upstream of the photocell. The photocell controls all functioning of the circuity described. Pressing of a selected button effects signal or code storage in a storage (MR) relay. At this point, the selection has been made and the selection lamp shown in FIG. 4-2 is extinguished so that no further selection will be made by the operator until that light is once more lit.

The system is thus conditioned for recording the signal on the tape band and this occurs when the parcel programmed interrupts the light beam.

At that time a connection is completed to cam switch P which switch is continuously closing and opening with each slat passing the beam, so that on the next closure of cam switch P after the beam is interrupted by a parcel all previously energized code relays, that is KR relays, are deenergized. Subsequently, switch P opens and the code relay for which the respective storage relay has been energized is then likewise energized. Following a short delay, due to the effect of condenser C4, such storage relay is then deenergized and the selection light is lit once more, apprising the operator that the next parcel may be coded.

Accordingly, the automatic deenergization of the coding relays depends upon the occurrence of three sequential conditions:

(1) Operator makes a station selection by pressing a coding push button
(2) The beam is interrupted when the programmed parcel passes the sensing means, i.e., the photocell
(3) Switch P closes.

Energization of the selected coding relay occurs as a fourth and rapidly following condition, namely, the opening of the switch P.

Any coding relay thus energized effects actuation of a respective solenoid track switch via the recording tape and readout system, and such track switch remains actuated to continually tilt all slats arriving that station. This condition remains until the respective code relay is deenergized which can occur only by the sequence enumerated above, namely, the programming of another parcel. Thus, if no subsequent parcel is put on the conveyor, the slats will continually be tilted at an actuated track switch for as long as the conveyor runs. It will readily be seen that the length of signal on the tape band is then only a function of the spacing between successive parcels and is in no sense a function of the length of any particular parcel.

The same storage relay may be selected twice in a row, if it is desired to divert successive parcels at the same station. This is made possible by deenergization of all storage relays each time the switch P opens. Such deenergization occurs with suitable delay (a function of condenser C4) in order to ensure energization and recording functioning of the same selected coding relay which likewise occurs upon opening of the switch P and which is to be again selected.

What is claimed is:

1. In a system for effecting a predetermined spacing between articles, a pair of tandem belts operating at a predetermined speed ratio and comprising an entrance belt and a discharge belt wherein said entrance belt runs at a slower speed than said discharge belt, means for effecting simultaneous starting and stopping of said belts comprising article sensing means disposed at the discharge end of said discharge belt, and circuitry means for stopping said belts responsive to spacing between articles as sequentially sensed by said sensing means when successive articles are spaced less than a predetermined distance apart when the downstream article is leaving the discharge belt, said circuitry means being operative to start said belts a predetermined time thereafter.

2. In a system as set forth in claim 1, said circuitry means comprising a time constant circuit predetermined to discharge in a time corresponding to a desired spacing between articles.

3. In a system as set forth in claim 2, said time constant circuit comprising a condenser, means for charging said condenser while an article is passing said sensing means, and comprising means for effecting discharge when said article has passed said sensing means, and further comprising motor control means responsive to the charged or discharged condition of said condenser to respectively stop or start said belt.

4. In a system as set forth in claim 3, wherein the rate of charge is substantially greater than the rate of discharge whereby said condenser may be charged relatively rapidly upon sensing of an article by said sensing means.

5. In a system as set forth in claim 3, said sensing means comprising a photo-resistive photocell, a transistor disposed to be biased to cut off when said cell is substantially non-conducting, relay means responsive to transistor cut-off to effect charging of said condenser and responsive to current conduction through said transistor to effect discharge when said photocell is conducting.

6. In a system as set forth in claim 3, said circuitry means comprising a transistor and relay means disposed to condition said motor control means to effect starting of said belts when said transistor is conducting and to effect stopping of said belts when said transistor is non-conducting, said condenser being connected to effect bias on said transistor so as to render said transistor conductive when said condenser is discharged and non-conductive when said condenser is charged.

7. In a system as set forth in claim 3, said sensing means comprising a photo-resistive photocell, a transistor disposed to be biased to cut off when said cell is substantially non-conducting, relay means responsive to transistor cut-off to effect charging of said condenser and responsive to current conduction through said transistor to effect dicharge when said cell is conducting, said circuitry means comprising an additional transistor and relay means disposed to condition said motor control means to effect starting of said belts when said additional transistor is conducting and to effect stopping of said belts when said additional transistor is non-conducting, said condenser being connected to effect bias on said additional transistor so as to render said transistor conductive when said condenser is discharged and non-conductive when said condenser is charged.

8. In a system as set forth in claim 1, including a source of D.C. having a negative line, a positive line, and a common line at an intermediate potential, said common line and one of said other lines being connected to said condenser for charging thereof, said condenser being connected thru a resistor to the other of said other lines for discharge, and said condenser being connected to said additional transistor for bias control thereof.

9. In a system for effecting a predetermined spacing between articles, a pair of tandem belts operating at a determined speed ratio and comprising an entrance belt and a discharge belt wherein said entrance belt runs at a slower speed than said discharge belt, means for effecting simultaneous starting and stopping of said belts comprising an article-sensing means disposed at the discharge end of said discharge belt, and circuitry means for stopping said belts responsive to spacing between articles as sequentially sensed by said sensing means when successive articles are spaced less than a predetermined distance apart when the downstream article is leaving the discharge belt, and for starting said belts a predetermined time thereafter, said circuitry means comprising a time constant circuit predetermined to discharge in a time corresponding to a desired spacing between articles, said time constant circuit comprising a condenser, means for charging said condenser while an article is passing said sensing means, and comprising means for effecting discharge when said article has passed said sensing means, and further comprising motor control means responsive to the charged or discharged condition of said condenser to respectively stop or start said belt.

10. In a system for effecting a predetermined spacing between articles, a pair of tandem belts operating at a predetermined speed ratio and comprising an entrance belt and a discharge belt wherein said entrance belt runs at a slower speed than said discharge belt, means for effecting simultaneous starting and stopping of said belts comprising an article-sensing means disposed at the discharge end of said discharge belt, and circuitry means for stopping said belts responsive to spacing between articles as sequentially sensed by said sensing means when successive articles are spaced less than a predetermined distance apart when the downstream article is leaving the discharge belt, and for starting said belts a predetermined time thereafter, said circuitry means comprising a time constant circuit predetermined to discharge in a time corresponding to a desired spacing between articles, said time constant circuit comprising a condenser, means for charging said condenser while an article is passing said sensing means and comprising means for effecting discharge when said article has passed said sensing means, and further comprising motor control means responsive to the charged or discharged conditions of said condenser to respectively stop or start said belt, said motor control means comprising relay means having a plurality of motor starter control contacts, said relay means being operative to individually open or close respective contacts responsive to the spacing of an article leaving said discharge belt relative to an article upstream thereof, wherein at least one such contact is normally open and is closed responsive to failure of said condenser to discharge to a predetermined extent.

11. In a system for effecting a predetermined spacing between articles, a pair of tandem belts operating at a predetermined speed ratio and comprising an entrance belt and a discharge belt wherein said entrance belt runs at a slower speed than said discharge belt, means for effecting simultaneous starting and stopping of said belts comprising an article-sensing means disposed at the discharge end of said discharge belt, and circuitry means for stopping said belts responsive to spacing between articles as sequentially sensed by said sensing means when successive articles are spaced less than a predetermined distance apart when the downstream article is leaving the discharge belt, and for starting said belts a predetermined time thereafter, said circuitry means comprising a time constant circuit predetermined to discharge in a time corresponding to a desired spacing between articles, said time constant circuit comprising a condenser, means for charging said condenser while an article is passing said sensing means, and comprising means for effecting discharge when said article has passed said sensing means, and further comprising motor control means responsive to the charged or discharged condition of said condenser to respectively stop or start said belt, said motor control means comprising means having a plurality of motor control contacts, said motor control means being operative through said circuitry means to individually open or close respective contacts to stop and start said motor responsive to the state of discharge of said condenser.

References Cited by the Examiner
UNITED STATES PATENTS

| | | | |
|---|---|---|---|
| 2,130,323 | 9/1938 | Lueckel | 198—21 |
| 2,184,905 | 12/1939 | Brintnall | 198—34 |
| 2,549,281 | 4/1951 | Armstrong | 198—34 |
| 2,816,647 | 12/1957 | Ruth | 198—34 |
| 2,984,366 | 5/1961 | Greller | 214—11 |
| 3,024,890 | 3/1962 | Belk | 214—34 |
| 3,075,630 | 1/1963 | Fisk | 198—76 |
| 3,096,871 | 7/1963 | Anderson | 214—11 X |

GERALD M. FORLENZA, *Primary Examiner.*

MORRIS TEMIN, HUGO O. SCHULZ, *Examiners.*